July 14, 1925.  
G. H. WADSWORTH  
EXTRUDING MACHINE  
Filed Aug. 18, 1923  
1,546,155  
2 Sheets-Sheet 1

INVENTOR  
George H. Wadsworth  
BY Walter Macklin,  
ATTYS.

July 14, 1925.

G. H. WADSWORTH

EXTRUDING MACHINE

Filed Aug. 18, 1923

1,546,155

2 Sheets-Sheet 2

INVENTOR
George H. Wadsworth.
BY Bates & Macklin,
ATTYS.

Patented July 14, 1925.

1,546,155

UNITED STATES PATENT OFFICE.

GEORGE H. WADSWORTH, OF AKRON, OHIO, ASSIGNOR TO THE WADSWORTH CORE MACHINE AND EQUIPMENT COMPANY, OF AKRON, OHIO, A CORPORATION OF OHIO.

EXTRUDING MACHINE.

Application filed August 18, 1923. Serial No. 658,027.

*To all whom it may concern:*

Be it known that I, GEORGE H. WADSWORTH, a citizen of the United States, residing at Akron, in the county of Summit and State of Ohio, have invented a certain new and useful Improvement in Extruding Machines, of which the following is a full, clear, and exact description, reference being had to the accompanying drawings.

This invention is concerned with the manufacturing of combustible briquettes and has for its general object the provision of a process and an apparatus for manufacturing fuel briquettes where the raw material comprises coal culm or dust and a suitable combustible binding material or agency such as a petroleum by-product wax, and a combustible sulphate solution.

A more specific object of my invention is the provision of an apparatus for forming briquettes by extruding through a multiplicity of openings with corresponding extruding devices in the openings, wherein such material is used that it is necessary to continuously and thoroughly agitate and mix the material before being extruded.

Another object of the invention is to so mix and extrude the substance from the various extruding openings that it will be in the form of a substantially rigid mass, at least capable of holding its shape for handling before and during the baking processes.

My invention contemplates the provision of an extruding machine embodying a novel arrangement of extruding screws and mixing devices which co-operate in mixing the ingredients of the briquettes and in forcing the semi-plastic mixture through dies whereby the briquettes may be continuously extruded without causing variation in the proportions of the constituents comprising the briquettes.

Other objects of my invention will be hereinafter set forth in the following description which relates to the accompanying drawings illustrating a preferred apparatus for forming briquettes by extrusion. The essential characteristics are summarized in the claims.

Figure 1:
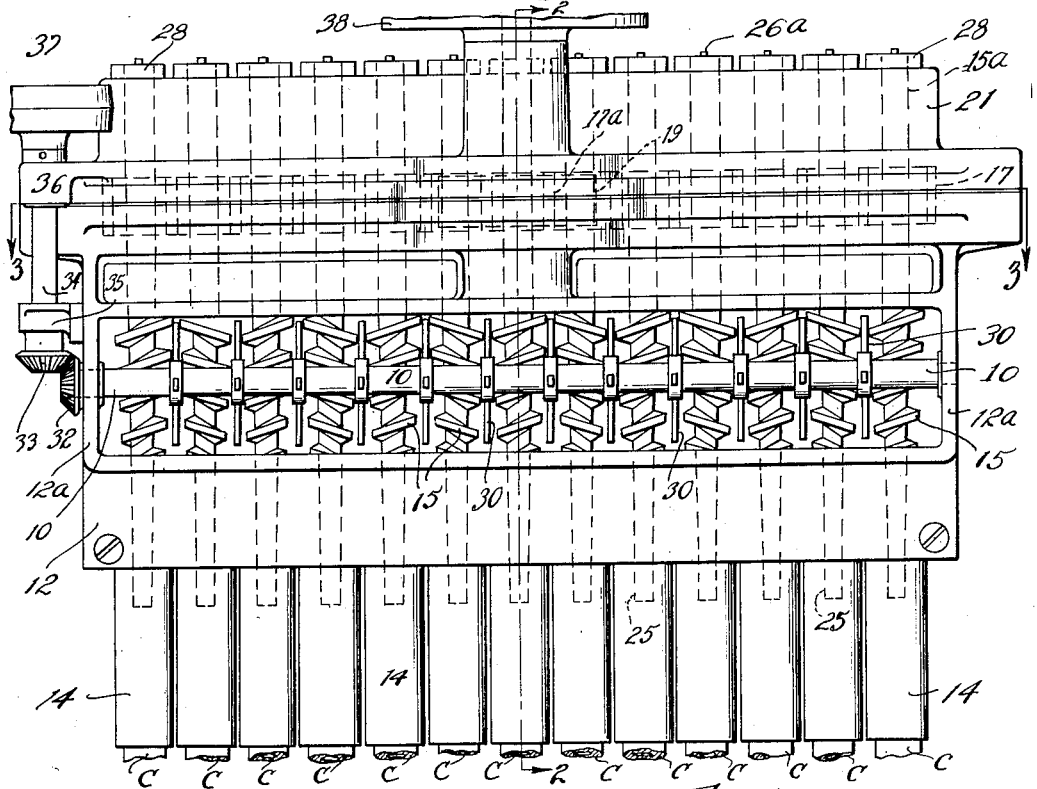
Figure 2:
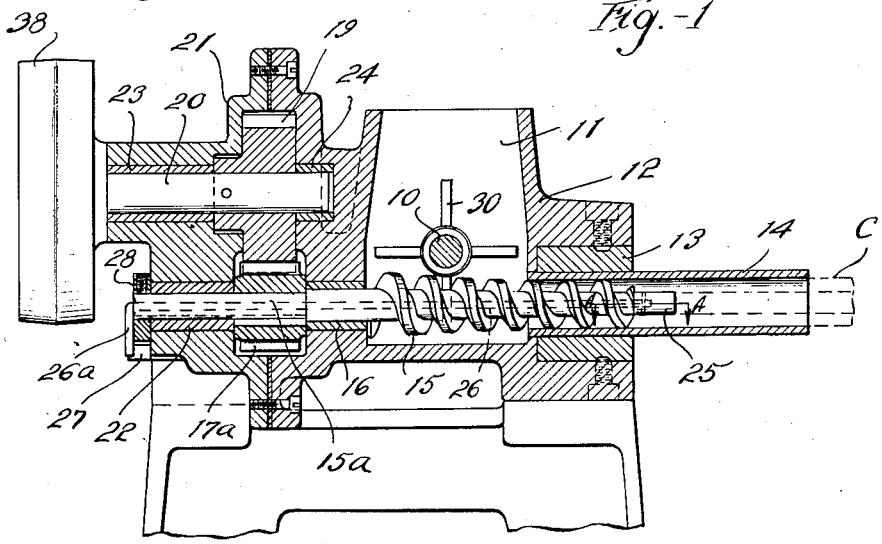
Figure 3:
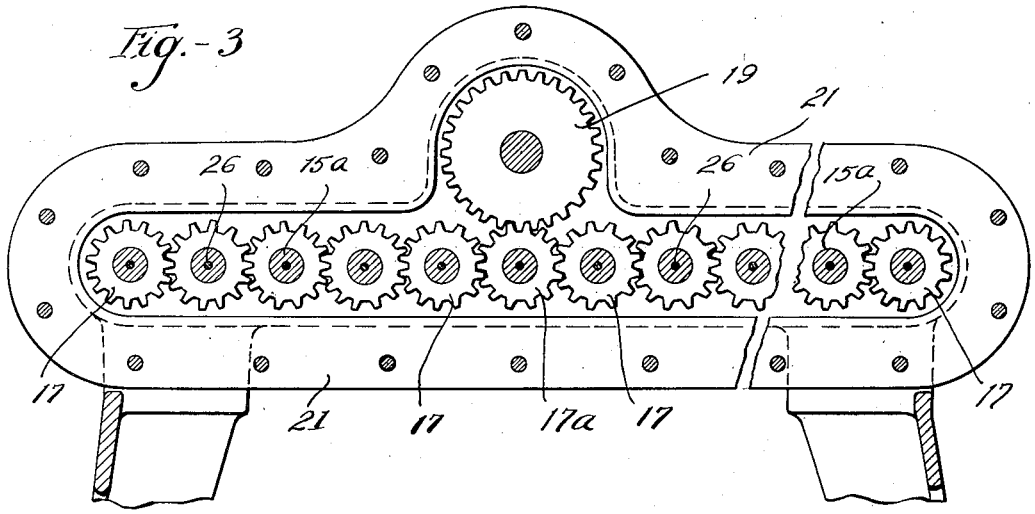
Figure 4:
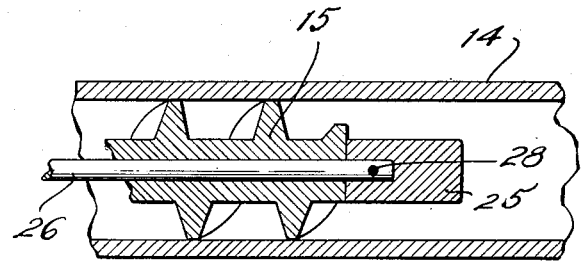
Figure 5:
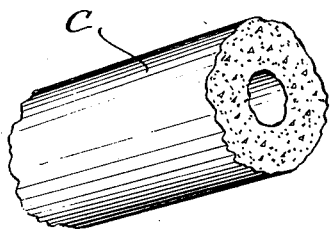

In the drawing, Fig. 1, is a plan view of a multiple briquette forming machine; Fig. 2 is a cross sectional side elevation taken substantially along line 2—2 of Fig. 1; Fig. 3 is a cross sectional elevation taken along the line 3—3 of Fig. 1 part being shown broken away to indicate a greater number of screws than shown; Fig. 4 is an enlarged cross sectional view taken through one of the extruding dies of the machine and Fig. 5 is a briquette formed by such an apparatus.

The present invention contemplates the provision of a method and apparatus for forming a briquette such as is described and claimed in my application, Serial No. 603,169 filed November 25th, 1922, wherein a briquette is illustrated which comprises substantially a tubular member formed of coal dust or culm, shredded oil refinery wax, water and a binder such as lignon. By my present method, it is possible to obtain a thorough mixing of the ingredients while feeding the material to extruding worms which force the material through tubular die members, with sufficient pressure to cause the formation of the material into cylinders or tubes.

As shown in Figs. 1 and 2, I provide a multiple die extruding machine comprising a mixing device in the form of a rotating shaft 10 carrying mixing blades 30 and disposed within a mixing chamber 11. This chamber may be formed in a top frame member 12, and may extend substantially the width of the machine. A plurality of left and right spiral worms 15 are disposed adjacent the bottom of the chamber 11 and may be positively driven as will be hereinafter described. The frame member 12 has suitable openings equally spaced and formed in the front wall thereof to receive bushing members 13 which carry tubular die members 14 which extend a substantial distance forwardly of the machine. The extruding worms 15 have the forward ends thereof extending into the inner end of the die tubes 14, and terminate adjacent the outer ends of the bushing members 13. The bushings 13 have walls of sufficient thickness to reinforce the die tubes at the point where the greatest pressure is exerted thereon; namely, throughout that length of the tubes which contains the outer end of the extruding worms 15. The opposite ends of the worm members are suitably journaled in bearing members 16 rigidly fixed in bored openings formed in the rear wall of the frame member 12. The rear wall of the frame member 12 is suitably formed to provide countersunk spaces relative to the bearings 16 to receive meshing pinion members 17, rigidly fixed upon the shanks 15ª of the feed worms 15.

Any number of dies and worms may be incorporated in the apparatus. In the present instance, thirteen feed worms are shown mounted in the frame member 12, the central pinion 17ª being driven by a gear member 19, which is rigidly fixed to shaft member 20, carried by a second top frame member 21, in the nature of a bearing support for bushing members 22 supporting the rearward or shank end of the feed worms. The shaft 20 may be rotatably mounted in bearing members 23 and 24 carried by the top frame members 21 and 12 respectively. As shown in Figs. 1, 2 and 3, the top frame members 12 and 21 are formed to comprise not only supporting members for the various feed worms and the drive shaft 20 but also as a housing means to completely enclose all of the pinions and gears of the worm driving mechanism. The extruding worms have the shanks thereof reduced in diameter to provide a shoulder whereby the thrust from the worms may be taken by pinion members 17, and the thrust from the pinion members will be directed against the top frame member 21. As illustrated in Fig. 3, a sufficient number of screw members is provided to maintain the top frame member in rigid relation with the top frame member 12 and this stress is eventually absorbed in tension by the screw members.

The briquettes C are preferably formed in the shape illustrated in Fig. 5, whereby the ingredients may be thoroughly compressed and the baking or drying of the briquettes is greatly facilitated by reason of the added exposed surfaces of the briquettes obtained by forming them with the centers cored. The coring of the briquettes is effected as they are being extruded through the die tube 14, by replaceable projecting members 25, secured to anchor rods 26, positioned in openings extending through the feed worms 15. The members 26 terminate in downward extensions 26ª whereby the core members 25 may be maintained immovable by reason of the extensions 26ª bearing against lug members 27 extending rearwardly from the lower portion of the frame member 21. The core members 25 may be secured to the anchor members 26 in any suitable manner such as small pin members 28, extending through the core members and the outer ends of the members 26, the core members 25 thus being maintained in non-rotatable relation relative to the die tubes 14 when the worms 15 are rotating.

As will be noted in Fig. 1, the extruding worms 15 are spaced apart at a fixed distance to permit the passage of the mixing blades 30 mounted upon the shaft member 10. These mixing blades carry the material from the top region of the mixing chamber 11 downwardly into contact with the extruding worms and serve the double purpose of mixing and agitating the material as it comes into the mixing chamber and to feed the material downwardly into contact with the feed worms whereby a uniform density is obtained in the briquettes due to the presence of sufficient material in contact with the feed worm to insure a constant extruding action.

The shaft member 10 may extend the full length of the mixing chamber and be suitably bearinged in the end wall 12ª of the top frame member 12 and have one end thereof extend exteriorly of the chamber a sufficient distance to provide engagement for a bevel gear member 32, which is driven by a meshing bevel gear 33, mounted on a projecting end of a drive shaft 34 extending transversely at one end of the machine. The drive shaft 34 may be carried by suitable brackets 35 secured to the top frame members 12 and 21 respectively. A pulley member 37 mounted on the rear end of the shaft member 34 at the rear of the machine may serve as a power connecting means for driving the agitating shaft. A second pulley 38 may be mounted on a rearward projection of the stub shaft 20 whereby the pinion 17ª and the pinion 17 on either side thereof may be driven.

From the foregoing description, it will be apparent that I provide a method and apparatus for forming briquettes from coal dust or culm and which, when mixed with suitable binding and combustible material may be extruded through my apparatus and form briquettes by continuous operation of a series of left and right hand extruding worms which compress and force the mixed material through tubular die members, the feed worms carrying or supporting core means whereby the briquettes may have a cylindrical form with a cored center, thereby obtaining a maximum exposed area per volume while obtaining a uniform density in the briquette; the briquettes being thus compressed to obtain a sufficient rigidity whereby they may be readily handled during the baking or drying process to which they are subjected. It will be noted furthermore, that my apparatus includes means for thoroughly mixing the ingredients while feeding the material through the feed worms, thereby greatly simplifying the process of making combustible briquettes as well as obtaining an economical production thereof.

I claim:

1. In a machine of the character described, the combination of a material receiving member having a common opening for feeding briquette material to openings of extruding devices, a plurality of parallel extruding worms associated with said openings, means for driving the worms, and material mixing means disposed between adjacent worms.

2. In a machine of the character described, the combination of a pair of rotating extruding worms having a common feed opening and material mixing means positioned in said material feed opening and disposed between said worms.

3. In a machine of the character described, the combination of a plurality of right and left spirally formed extruding worms arranged in parallel relation so that a worm having a right spiral will be disposed intermediate worms having a left spiral and vice versa, a series of meshing gears for simultaneously driving the worms, and material mixing means disposed between adjacent worms.

4. The combination of a material receiving member having a common opening for feeding briquette material to openings of extruding devices, a plurality of parallel extruding worms associated with said openings, means for driving the alternate worms in a common direction and material mixing means disposed between adjacent worms.

5. In a machine of the character described, the combination of a pair of rotating extruding worms positioned side by side and having a common feed opening, material mixing means positioned in said material feeding opening and disposed between said worms, and means for driving the worms in opposite directions.

6. In a machine of the character described, the combination of a plurality of right and left spirally formed extruding worms arranged in parallel relation, a series of meshing gears for simultaneously driving the worms, material mixing means disposed between each pair of worms and frame supporting means for the foregoing means, said frame supporting means having an opening common to all of said worms.

7. In a machine of the character described, the combination of a frame member provided with a mixing chamber, a plurality of alternately right and left spirally formed extruding worms rotatively mounted in said frame member adjacent the bottom thereof, agitating means extending transversely of and in a plane parallel to said extruding worms and disposed in said mixing chamber, means for positively driving all of said extruding worms and means for driving said agitating means.

8. In a machine of the character described, the combination of a frame member having a mixing chamber, a plurality of spiral extruding worms disposed in said chamber adjacent the bottom thereof and rotatively supported by said frame member, a shaft member extending within the mixing chamber transversely of said extruding worm and agitating and feeding means carried by said shaft and disposed between said worms whereby the material received in the mixing chamber may be agitated thereby and moved downwardly into contact with said extruding worms.

9. In a machine of the character described, the combination of a frame member provided with a mixing chamber, a plurality of (right and left) spirally formed extruding worms rotatively mounted in said frame member adjacent the bottom of said mixing chamber, extruding dies in alignment with each of said extruding worms and material agitating means extending transversely of and in a plane parallel to that occupied by said extruding worms adapted to agitate and feed the material thereto.

10. In a machine of the character described, the combination of a frame member provided with a mixing chamber, a plurality of extruding worms disposed adjacent the bottom thereof and rotatively mounted on said frame member, an extruding die in alignment and cooperating with each one of said extruding worms and agitating means disposed within the mixing chamber between the worms and supported by said frame member, said agitating means extending longitudinally of the mixing chamber and having its axis of rotation perpendicular to said extruding worms whereby the material received by the mixing chamber may be agitated and forced downwardly into contact with the worms.

11. In a machine of the character described, the combination of a frame member provided with a mixing chamber, a plurality of extruding worms rotatively supported by said member adjacent the bottom of said mixing chamber, die members associated with each one of said extruding worms, meshing gear members mounted upon rearward extensions of said extruding worms, a second frame member secured to the first frame member and forming therewith a bearing and housing means for said gears and agitating means extending transversely of and parallel to said extruding worms, substantially the same distance from each worm and disposed within said mixing chamber above the worms.

12. In a machine of the character described, the combination of a frame member provided with a mixing chamber, a plurality of right and left spirally formed extruding worms disposed therein, dies cooperating with each one of said worms, intermeshing gears mounted upon shanks of said worms whereby they may be driven in unison, a shaft member disposed within the mixing chamber of said frame member and extending transversely of the worms and thereabove, and a plurality of agitating means carried by said shaft member and disposed between the respective worm members whereby material in said mixing chamber may be agitated and be fed downwardly into contact with said extruding worms.

13. In a machine of the character described, the combination of a frame member provided with an elongated mixing chamber, a series of right and left spirally formed extruding worms disposed adjacent the bottom of the mixing chamber, a second frame member, means associated with both of the frame members for rotatively supporting said extruding worms, with the forward ends thereof free, a plurality of tubular members secured to the first-named frame member and communicating with said mixing chamber whereby the free ends of the extruding worms may extend thereinto, core means mounted upon the free ends of the extruding worms and means extending longitudinally of the extruding worms and associated with said second frame member for preventing rotation of the core means when the said feed worms are rotated.

14. In a machine of the character described, the combination of a frame member provided with a mixing chamber, a plurality of right and left spirally formed extruding worms disposed adjacent the bottom thereof and rotatively supported by said frame member, extruding dies associated with the forward end of the said extruding worms and agitating and feeding means disposed within said mixing chamber and extending transversely of said extruding worms, including rotating blades adapted to feed the material downwardly and between said extruding worms.

In testimony whereof, I hereunto affix my signature.

GEO. H. WADSWORTH.